Figure 1:
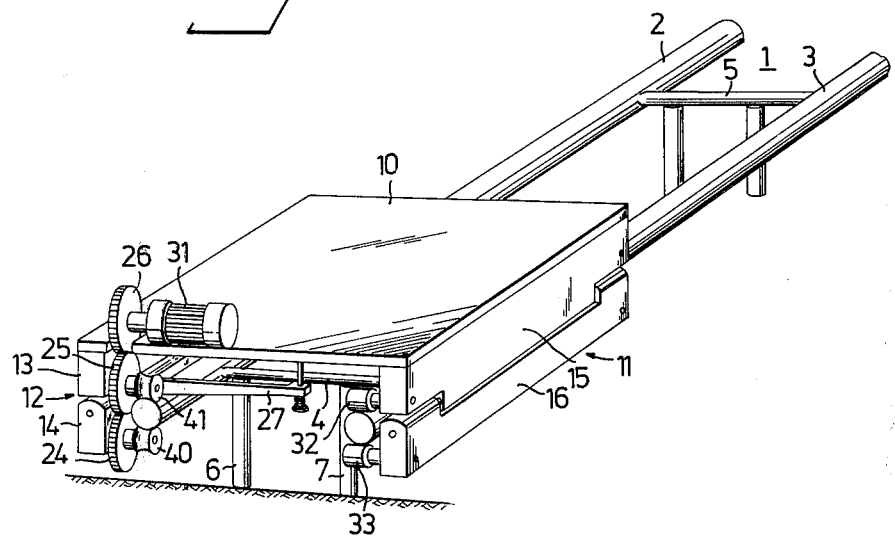

United States Patent [19]

Grop

[11] 4,023,503

[45] May 17, 1977

[54] CONVEYING INSTALLATION

[75] Inventor: Olof Sune Grop, Enskede, Sweden

[73] Assignee: Tekniska Rontgencentralen AB, Stockholm, Sweden

[22] Filed: Oct. 3, 1975

[21] Appl. No.: 619,159

[30] Foreign Application Priority Data

Oct. 3, 1974    Sweden ............................ 7412450

[52] U.S. Cl. .................... 105/30; 104/242
[51] Int. Cl.² .......................... B61D 15/12
[58] Field of Search ............. 105/29 R, 30, 153; 104/1 A, 242, 244, 245, 246, 229, 230, 231, 232, 233; 295/1, 31 R, 34; 228/32, 104; 73/67.8 S

[56] References Cited

UNITED STATES PATENTS

| | | | |
|---|---|---|---|
| 538,278 | 4/1895 | Place | 105/30 |
| 1,986,413 | 1/1935 | Ruemelin | 105/153 |
| 2,660,128 | 11/1953 | Hayes | 104/246 |
| 2,877,716 | 3/1959 | Ryznar | 104/1 A |
| 3,429,280 | 2/1969 | Dashew et al. | 105/29 R |
| 3,446,158 | 5/1969 | Pettit | 105/153 X |
| 3,469,536 | 9/1969 | McCracken | 105/30 |
| 3,698,326 | 10/1972 | Schurch et al. | 105/153 X |
| 3,774,547 | 11/1973 | Widiger et al. | 104/244 |
| 3,854,419 | 12/1974 | Cocroft | 105/153 |

Primary Examiner—Robert J. Spar
Assistant Examiner—Randolph A. Reese
Attorney, Agent, or Firm—Sughrue, Rothwell, Mion, Zinn & Macpeak

[57] ABSTRACT

A conveying system for placement adjacent to the surface of an object for inspecting that surface is disclosed. The system comprises a parallel rail track formed from cylindrical rails and an inspection trolley riding on that track having two pairs of wheels arranged about the tracks. The first pair of wheels are axially undisplaceable relative to the rail and are formed of trough-shaped surfaces with a circumference of the same radius of the rail. The second set of wheels is displaceable relative to a second rail and engage that rail. The first set of wheels is driven by gears interposed between the wheels and a drive motor and utilize compression generating members to urge the wheels toward each other and toward the rail.

6 Claims, 2 Drawing Figures

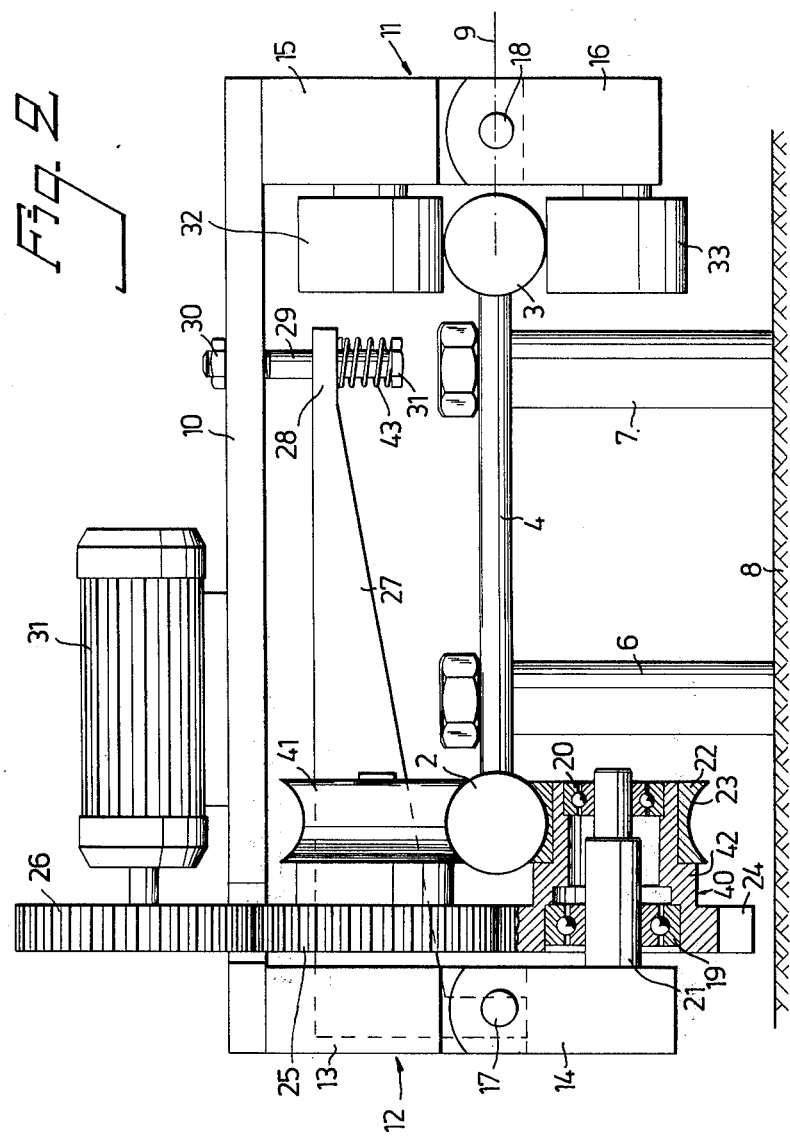

CONVEYING INSTALLATION

The invention relates to a conveying installation intended to be placed on or adjacent a surface of an object for completely or partially inspecting the former, and comprising a driven inspection trolley with wheels arranged to roll on a rail track following the superficial parts to be inspected.

In such an installation the inspection trolley must be driven automatically with very great exactitude along parts, e.g. welded joints, which have to be examined periodically, e.g. with supersonic equipment, and furthermore, the exact position of the inspection trolley must often be determined. This puts extremely great demands both on the track and the driving mechanism.

In known installations a track is therefore used which consists of a ferrous or non-ferrous rail which on its side surfaces has grooves for flanges on the wheels of the inspection trolley, so that the sideways position of the trolley can be exactly determined, there being formed on the upper side of the rail a rack engaging with a pinion on the trolley whereby the movement of the trolley along the track can be determined with great accuracy. As long as such a rail is straight, no problems arise, but as soon as the rail is curved alterations occur in the teeth of the rack, and with sharp curves the teeth will also be deformed so that driving cannot take place with any degree of accuracy. Up to now, it has therefore been necessary to manufacture the rail sections in small lengths, made to correspond to the curvature of the rail track or the surface on which the respective rail section is to be erected. Manufacturing the teeth of such rail sections will be very costly and time-consuming, and connecting the rail sections, especially the rack sections causes large problems. Another problem occuring with racked rails is that a foreign body can fasten between two teeth, thereby preventing the inspection trolley, which is usually controlled from a programmed installation, from being driven along the track, or also causing it to stick, which means that somebody has to go in and release the trolley by hand, and this causes difficulties, especially in reactor plants.

It is therefore an object of the invention to provide a conveyor installation of the type mentioned in the introduction, comprising a track which in a standard design can be curved in an arbitrary direction without there being any problems with the trolley movement or trolley driving, and to provide a trolley suited thereto which can be driven at an infinitely variable speed, in contradistinction to what is the case with rack and pinion operation and which can be driven more exactly than what is possible with known installations.

This object is completely realized by the invention set forth in the patent claims.

The invention will now be described in conjunction with the attached drawings, on which FIG. 1 shows a very much simplified perspective view of a portion of a conveying installation according to the invention, and FIG. 2 shows an enlarged endview of the installation according to FIG. 1.

A track 1 consists of two rails 2 and 3 made from cylindrical rods or cylindrical pipes in stainless steel, for example. The rails 2 and 3 are joined to each other by means of crosspieces, e.g. crosspieces 4 and 5, distributed along the track 1 and with their ends rigidly united with the rails 2 and 3 to keep the latter at a distance from and parallel or at least substantially parallel with each other. The crosspieces 4 5 have holes for attaching to struts 6 or 7, which at their free ends are attached for example to a wall 8 in a reactor tank.

When such a track 1, which may and preferably shall be manufactured in a single continuous length along a welded joint or the like which is to be examined, and due to the welded joint following a singly curved or doubly curved portion of the wall 8, must be curved partly in the common surface plane of the rails 2 and 3 and partly out of this surface plane, the rails will be displaced relatively to each other and the initial parallelism cannot be maintained. Such a deformation which causes great problems with the known tracks, completely lacks importance by reason of the new trolley.

The trolley shown by way of example on the drawing comprises a top plate 10 of stainless steel, for example. Two side assemblies 11 and 12 which are substantially parallel with the rails 2 and 3 are rigidly attached to the underside of the top plate 10. In the shown embodiment, each side assembly consists of two portions 13, 14 and 15, 16, pivotable relative to each other and pivotable about shafts 17 and 18 respectively. Of the lefthand side assembly 12, the pivotable portion 14 carries a driving wheel 40 and the portion 13, rigid relative to the plate 10, carries a second driving wheel 41. Both driving wheels comprise a hub 42 which by means of ball bearings 19 and 20 are mounted on a journalling pin 21 projecting from the pivotable portion 14. The outer end of the hub 42 carries a wheel ring 22 which is stationary relative to the hub and has on its outer surface a groove 23, the radius of curvature of which corresponds to the radius of curvature of the rail 2. The other end of the hub 42 is made with a gear wheel 24 in engagement with an equally large gear wheel 25 formed on the hub of the driving wheel 41. The gear wheel 25 is in its turn in engagement with a pinion 26 driven by a motor 31, e.g. an electric motor. Energy is supplied to the motor 31 by means not shown here. In the present case both the driving wheels, which are assumed to have the same diameter, will be driven at the same speed. Driving wheels with different diameters, driven with the same peripheral speed, can also be used.

In order that a positive driving engagement shall be established between the driving wheels 40 and 41 and the rail 2, the contact surfaces of the wheels are preferably coated with a friction material, e.g. rubber, and the rail 2 may also be provided with a coating or rubber or the like.

To further improve the driving engagement, at least one driving wheel is acted on by a spring or the like, which presses the wheel against the rail in such a manner that the rail is kept clamped between both the wheels in the wheel pair. In the illustrated embodiment a lever 27 is attached to the pivotable side portion 14. The free end 28 of the lever 27 is provided with an opening (not shown) through which a bolt 29 freely passes. The bolt is screwed into a threaded hole in the plate 10 and locked by means of a nut 30. Between the head of the bolt 29 and the end 28 of the lever 27 there is situated a compression spring 43 for pressing the lever upwards and thereby striving to swing the portion 14 around the shaft 17. The wheel 40 will thus be displaced upwards to push the rail 2 rightly against the wheel 41, which is immovable in a radial direction, there being thus no risk of slipping and exact driving of the trolley is accomplished.

When the track is erected, the rail 2 is brought into the intended position in relation to the welded joint, or the like, which is to be examined by means of the equipment mounted on the trolley or on a separate trolley which is pushed or pulled by the inspection trolley. In order that the position of the equipment in relation to the welding joint and the rail 2 is maintained, the driving wheels 40 and 41 are not axially displacable.

Two guiding wheels 32, 33 are freely rotatable mounted on the side assembly 11. Both guiding wheels are shown here as having completely cylindrical outer surfaces. The guiding wheels are situated vertically above and below the rail 3, respectively, but are not in contact with any great force, on the contrary, a certain insignificant amount of play can be permitted in some cases.

The purpose of the two outwardly pivotable portions 14 and 16 is to enable the trolley to be mounted simply on the rails. The side assemblies 11 and 12 can however be unparted, and in this case the trolley is pushed onto the rails from one end of the track 1. The side portion 14 is kept in its working position by the lever 27 and the side portion 16 by locking means (not shown).

With the described embodiment of the track and trolley, variations in the relative positions of the rails will not mean that driving deteriorates, since the driving wheels 40 and 41 will always follow the rail 2 exactly, even if the latter should be deformed somewhat during bending. Variations in the relative positions of the rails 2 and 3 will be taken up entirely by the rail 3 gliding between the guiding wheels 32 and 33 in their axial direction.

The illustrated pairs of wheels 40, 41 and 32, 33 have their counterpart in similar pairs of wheels at the far end of the trolley (FIG. 1). Even if it is conceivable that only the wheel pair 40, 41 are driven from the motor 31, the other wheel pair or pairs coacting with the rail 2 can be driven, and similarly one or more of the guiding wheels can be driven by the motor if so desired.

The necessary gliding between the rail 3 and the guiding wheels 32, 33, which in the shown embodiment is enabled by the cylindrical outer surface of the wheels, can also be achieved in another way. It is thus possible for example to make the wheels 32 and 33 with grooves engaging round the rail 3 which allow an axial movement. The shafts of the wheels can possibly be axially glidably mounted in the side assembly 11. It is similarly possible to make the grooves in the driving wheels 40 and 41 V-shaped for example, the engagement surface against the rail 2 being thus decreased. In the shown embodiment both driving wheels 40 and 41 are assumed to have axes of rotation parallel with each other, but the axes can also form an angle to each other, since the only condition is that they synchronously drive the trolley on the rail, and positively grip the rail.

The conveying installation has above been described for examination of welding joints e.g. on a reactor vessel with doubly curved surfaces, but can naturally be used on simply curved or plane surfaces or on any other kind or object at all, e.g. a mast and for examining possible plate lamination for example, or to examine the surface appearance by means of a television camera.

The described embodiment can be modified in different ways within the scope of the patent claims. Thus both the rails do not need to be united with each other, but can be carried on the substructure which either consists of the surface or the object which is to be examined, or of a structure or the like separated from it. Furthermore, the required pressing force between the driving wheels can be obtained by means of a pneumatic or a hydraulic apparatus.

I claim:

1. A conveying installation intended to be placed on or adjacent to a surface on an object for complete or partially inspecting the latter, comprising: an inspection trolley, a rail cylindrical track said trolley having two pairs of wheels (40, 41; 32, 33) arranged to be driven on said rail track (1) following the surface portions which are to be inspected, said rail track comprising two rails (2) (3) substantially parallel with each other, the first pair of wheels of the trolley coacting with one rail (2) and being axially undisplaceable relative to the rail, the second pair of wheels of the trolley coacting and axially displaceable relative to said second rail, the wheels of each pair being arranged one above the other, and the respective pairs engage the associated rail between them, at least the first pair of wheels (40, 41) coacting with said one rail (2) have a trough-shaped circumferential surface, which grips around the adjacent cylindrical surface of the rail and fixes the wheel in an axial direction, at least one of said pairs of wheels have wheels driven by a driving means (24, 25, 26, 31), and means (24, 43) for generating a compressive force independent of gravity to urge said driven wheels in a direction towards each other and towards the intermediately lying rail portion.

2. A conveying installation as claimed in claim 1, characterized in that the driven wheels coacting with the said one rail are coupled to each other by means of gear wheels (24, 25) driven from the motor (31).

3. A conveying installation as claimed in claim 1, characterized in that first pair of wheels coacting with the one said rail has wheels with a circumferential surface having the same radius as the rail.

4. A conveying installation as claimed in claim 3, characterized in that the circumferential surface on each driven wheel is coated with a friction-increasing coating.

5. A conveying installation as claimed in claim 1, characterized in that each wheel pair coacting with the said one rail has wheels with a V-shaped circumferential surface.

6. A conveying installation as claimed in claim 1, characterized in that the means for generating a compressive force comprises spring means (43).

* * * * *